United States Patent
Kühnau et al.

(10) Patent No.: US 6,955,506 B2
(45) Date of Patent: Oct. 18, 2005

(54) DEVICE FOR PNEUMATIC CONVEYING OF BULK MATERIAL, ESPECIALLY GRANULAR MATERIAL

(75) Inventors: Holger Kühnau, Constance (DE); Guido Mayer, Salem (DE)

(73) Assignee: Motan Holding GmbH, Constance (DE)

( * ) Notice: Subject to any disclaimer, the term of this patent is extended or adjusted under 35 U.S.C. 154(b) by 0 days.

(21) Appl. No.: 10/708,742

(22) Filed: Mar. 23, 2004

(65) Prior Publication Data

US 2004/0202513 A1 Oct. 14, 2004

(30) Foreign Application Priority Data

Mar. 26, 2003 (DE) .......................................... 103 13 570

(51) Int. Cl.⁷ ............................................. B65G 51/20
(52) U.S. Cl. ........................................ 406/83; 406/192
(58) Field of Search .............................. 406/83, 192, 14

(56) References Cited

U.S. PATENT DOCUMENTS

| | | | | |
|---|---|---|---|---|
| 1,223,586 A | * | 4/1917 | Johnson | ........................ 366/16 |
| 1,952,859 A | * | 3/1934 | Hampton et al. | .............. 406/28 |
| 3,599,832 A | * | 8/1971 | Smith | ........................... 406/30 |
| 4,162,784 A | * | 7/1979 | Legille et al. | ............... 266/176 |
| 4,171,853 A | * | 10/1979 | Cleaver et al. | ................ 406/48 |
| 4,373,838 A | * | 2/1983 | Foreman et al. | .............. 406/14 |
| 4,473,326 A | * | 9/1984 | Oetiker | ......................... 406/14 |
| 5,615,701 A | * | 4/1997 | Yamabe et al. | ............. 137/205 |

* cited by examiner

*Primary Examiner*—Joe Dillon, Jr.
(74) *Attorney, Agent, or Firm*—Gudrun E. Huckett

(57) ABSTRACT

A device for pneumatically conveying bulk material has at least one flow limiter arranged in a conveying airstream. The flow limiter has a housing and at least one control member arranged in the housing. The control member controls a flow velocity of the conveying airstream as a function of a dynamic pressure differential. The position of the at least one control member in the housing is determined by an equilibrium between a restoring force acting on the at least one control member and an opposed force oriented in a direction opposite to the restoring force. The opposed force is caused by the dynamic pressure differential and acts on the at least one control member.

24 Claims, 5 Drawing Sheets

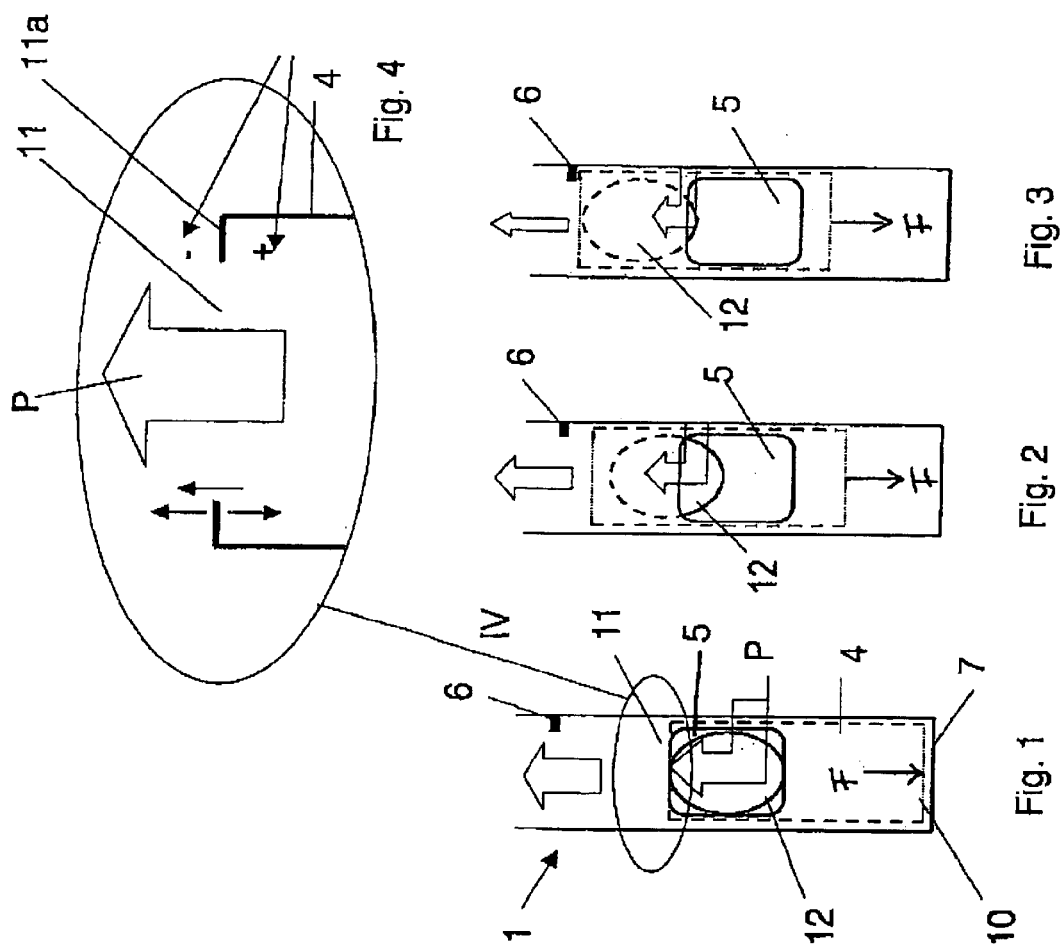

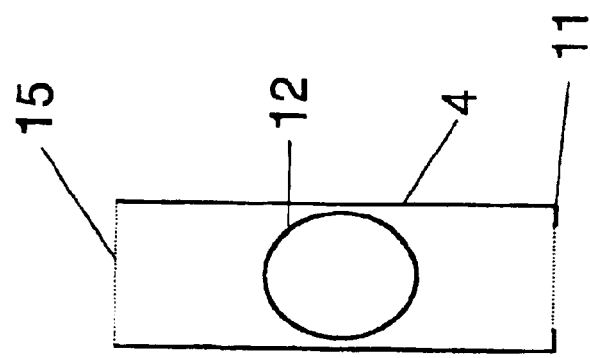
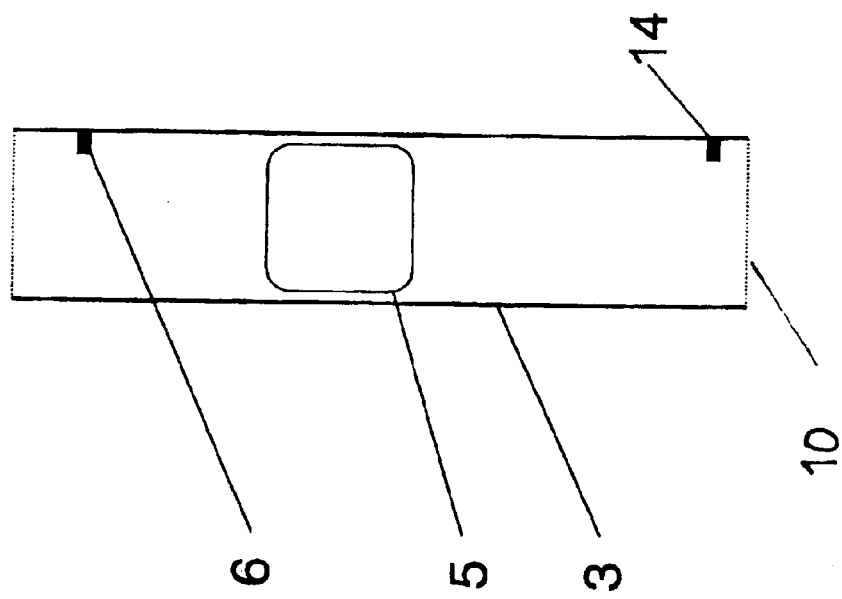

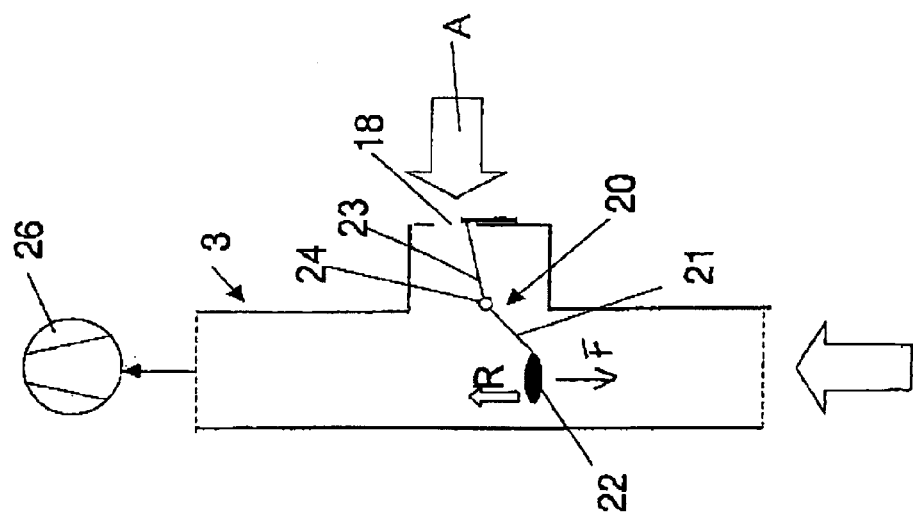
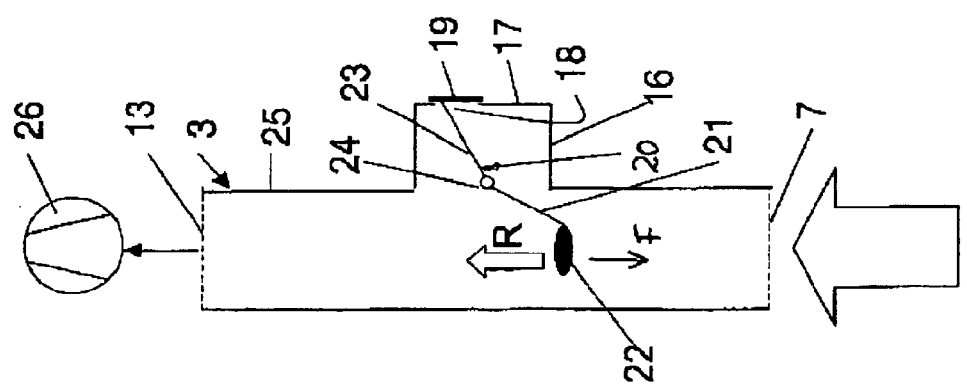

DEVICE FOR PNEUMATIC CONVEYING OF BULK MATERIAL, ESPECIALLY GRANULAR MATERIAL

BACKGROUND OF INVENTION

1. Field of the Invention

The invention relates to a device for pneumatically conveying bulk material, especially granular material. The device comprises at least one flow limiter provided within the conveying airstream.

2. Description of the Related Art

In known devices of this kind, the air velocity in the pipelines should not be too low or too high in order to prevent that the conveying action collapses or that the material to be conveyed is damaged and the conveying device is exposed to increased wear. The conveying velocity is affected by several factors, inter alia, pressure loss of the device, the blower output, and the pressure loss caused by the material to be conveyed. In principle, attention must be paid that the blower is as small as possible and as powerful as needed. In this connection, the conduit with the highest pressure loss is used for guidance. In conveying stretches having minimal losses, i.e., relatively short conveying stretches, conveying stretches having minimal height differences and relatively great conduit diameters, the pressure losses must be increased by using apertures as flow limiters in order to prevent an impermissibly high conveying velocity. However, when the pressure loss changes during the conveying process (this can be the case any time when emptying by suction the pipeline after completion of the conveying action), the occurring pressure losses can no longer be compensated by means of the apertures. With decreasing load, the pressure loss also decreases; as a result, the conveying velocity increases. This velocity increase can be easily so high that damage will be caused.

SUMMARY OF INVENTION

It is an object of the present invention to develop a device of the aforementioned kind such that it prevents reliably an increase of the conveying velocity to impermissibly high ranges.

In accordance with the present invention, this is achieved in that the flow limiter comprises at least one control member arranged in a housing which control member regulates the flow velocity of the conveying airstream as a function of a dynamic pressure differential.

As a result of the configuration according to the invention, the flow limiter is designed such that the control member (control body) automatically maintains the flow velocity of the conveying airstream in the housing within a desired or permissible range. As a result of a dynamic pressure differential, i.e., the mass flow of the conveying airstream, a force is exerted onto the control member. When the flow velocity surpasses a preset limits, the dynamic pressure differential is so great that the control member is adjusted or moved within the housing as a result of the force acting on it such that the flow velocity drops below the preset limit. With this control action it is ensured in a constructively simple way that the flow velocity of the conveying airstream is maintained within a permissible range. This ensures that, when the airflow is reduced, the flow limiter immediately releases the intake cross-section for the secondary air; in this way, it properly prevents undesirable vibrations. The flow limiter can also be used in connection with conveying stretches having minimal losses, i.e., relatively short conveying stretches, conveying stretches with minimal height differences and large conduit diameters, in order to prevent an impermissibly high conveying velocity.

BRIEF DESCRIPTION OF DRAWINGS

FIG. 1 shows in a schematic illustration a flow limiter according to the invention for a conveying device for bulk material in a first operating position.

FIG. 2 shows schematically the flow limiter of FIG. 1 in a second operating position.

FIG. 3 shows schematically the flow limiter of FIG. 1 in a third operating position.

FIG. 4 shows detail IV of FIG. 1.

FIG. 9 shows an enlarged illustration of a housing of the flow limiter according to FIG. 7.

FIG. 10 shows an enlarged illustration of a control member of the flow limiter of FIG. 7.

FIG. 11 shows a further embodiment of a flow limiter illustrating a situation corresponding to that of FIG. 7.

FIG. 12 shows the flow limiter of FIG. 11 illustrating a situation corresponding to that of FIG. 8.

DETAILED DESCRIPTION

Figure 6:
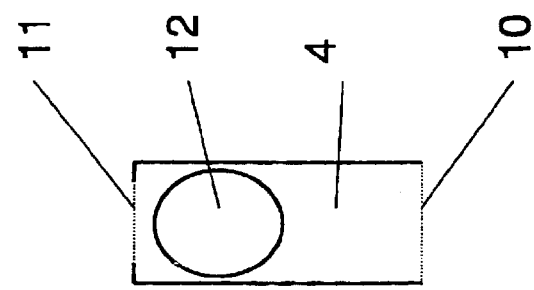
FIG. 6 shows an enlarged illustration of a control member of the flow limiter of FIGS. 1 through 3.

The flow limiters illustrated in FIGS. 1 through 12 are arranged, for example, in a pipeline of a device (not illustrated) for pneumatically conveying, for example, granular plastic material, wherein the pipeline extends between a supply container or reservoir and a processing machine. In the pipeline, the air conveying velocity should not be too high or too low because, otherwise, the conveying action of the granular material will collapse or the material being conveyed will be damaged and the device will be exposed to increased wear. In order to prevent an increase of the conveying velocity during the conveying process or during emptying of the conveying line by suction, the flow limiters are arranged within the corresponding pipeline.

The flow limiter 1 illustrated in FIGS. 1 through 3 has a housing 3 in which a control member 4 is provided. Both parts have advantageously a circular cross-section. The housing 3 has a housing wall with a lateral intake opening 5 that has approximately a square contour in the illustrated embodiment. Of course, any other suitable contour, for example, a circular contour, can be provided. The housing 3 and/or the control member 4 can also have a different cross-section, for example, a rectangular cross-section. The housing 3 has an upper stop 6 that projects from the inner wall of the housing 3 and is positioned with relatively minimal spacing below the upper housing edge 9. The housing is closed off at its bottom side 7.

The control member 4 is open at its lower end 10. At the upper end of the control member 4, an aperture 11 is provided that is formed by a central opening in the lid. The control member 4 has a peripheral wall with a lateral opening 12 having an oval contour in the illustrated embodiment.

In the mounted state according to FIGS. 1 to 3, the control member 4 is freely movable within the housing 3 between its bottom 7 and the stop 6. Because of the restoring force acting on the control member 4 in its initial position according to FIG. 1, the control member 4 rests on the housing bottom 7; the restoring force is provided by the weight of the control member 4. In this position, the opening 5 of the housing 3 and the opening 12 of the control member 4 are approximately congruent. In this way, a lateral intake opening for the conveying air is formed. As illustrated in FIG. 1, the longitudinal (major) axis of the oval opening 12 matches, for example, the height of the opening 13, while the minor axis of the oval opening 12 is smaller than the width of the opening 5. In this position of the control member 4, the flow cross-section for the conveying air is formed by the flow cross-section of the oval opening 12. The restoring force can also be realized by a spring force. In any case, the size of the openings 5, 12 is selected such that for full overlap of the openings the pressure loss is as minimal as possible.

The conveying air enters through the intake opening 5, 12 laterally in the direction of arrow P into the control member 4 and flows through it upwardly. The conveying air exits the control member 4 through the aperture 11 and flows through the upper open end of the housing 3.

The conveying air strikes partially the lid 11a so that on the bottom side of the lid 11a overpressure is generated; it is indicated in FIG. 4 by a plus sign (+). On the outer side of the lid 11a, there is a reduced pressure which is indicated by a minus sign (−). Because of the automatically adjusted pressure differential, a force is exerted in the flow direction P on the control member 4. The magnitude of the force is proportional to the air velocity at the aperture 11. The size of the aperture 11 and the weight of the control member 4, or of a possibly present restoring force, must be selected such that at the right time before reaching the permissible conveying air velocity, the force generated at the aperture 11 and acting on the control member 4 becomes greater than the restoring force. In this connection, the following control loop is realized. When the force on the aperture 11 is stronger than the restoring force (e.g., spring) of the control member 4, the control member 4 is moved in the flow direction P axially in the housing 3 wherein the openings 5, 12 of the housing 3 and of the control member 4 are moved relative to one another (FIG. 2). In this way, the free cross-section of the air inlet opening is reduced so that a corresponding pressure loss results that causes the air velocity to drop. This, in turn, has the effect of a reduction of the force acting on the aperture 11. The control member 4 is then no longer pushed farther in the flow direction P when the aperture force is identical to the restoring force of the control member 4. This results in a balanced or equilibrium state within the permissible range.

When the pressure differential at the aperture 11 becomes even smaller, the force that is acting on the control member 4 will continue to drop. In this way, the control member 4 is moved in a direction counter to the flow direction P so that the free flow cross-section for the conveying air is increased again. The control member 4 remains in a position in which an equilibrium between the restoring force F and the counteracting opposed force acting in the flow direction P onto the control member 4 is generated.

In this way, the control member 4 is automatically adjusted within a very short period of time to the equilibrium position that corresponds to the flow conditions.

The maximum displacement position (FIG. 3) of the control member 4 is achieved when it rests with its lid 11a on the stop 6 of the housing 3. In this position, the overlap of the two openings 5, 12 is minimal so that the free flow cross-section for the conveying air is correspondingly reduced.

In each flow phase of the conveying airstream, the described control loop is present. When the force acting at the aperture 11 of the control member 4 is greater than the restoring force F acting on the control member 4, the control member 4 is moved in the flow direction P. By means of the resulting reduction of the free flow cross-section for the conveying air, a higher pressure loss occurs at this location and causes a drop of the flow velocity. This directly has an effect on the aperture 11 because the pressure differential that occurs here is reduced and, correspondingly, the force acting on the control member 4 is reduced. Movement of the control member 4 is stopped as soon as this force is identical to the restoring force F. The flow velocity of the conveying airstream is then within the permissible range.

Figure 5:
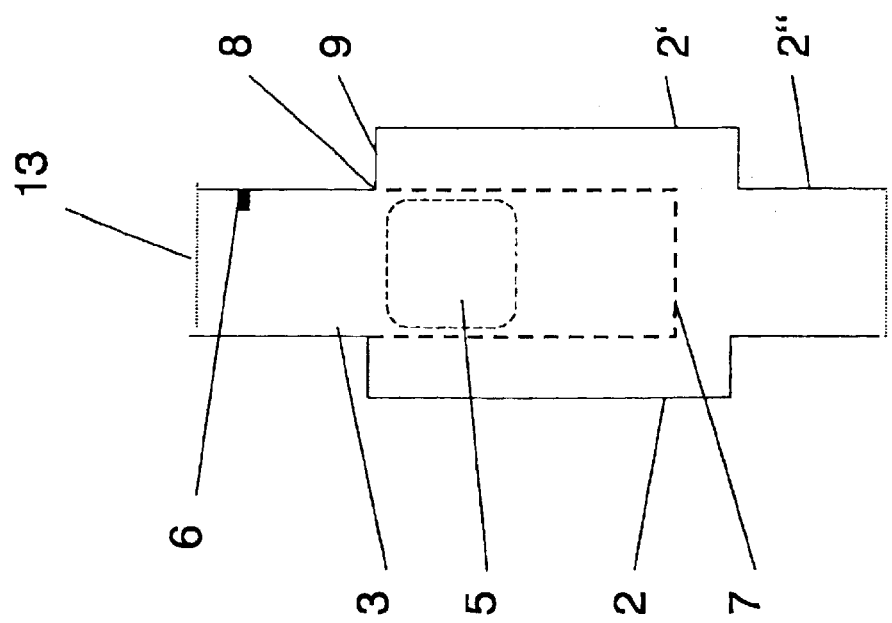
FIG. 5 is an enlarged illustration of the housing of a second embodiment of the flow limiter according to the invention.

The housing of the flow limiter 1 can be designed in different ways. According to the embodiment of FIGS. 5 and 6, the housing is of a two-part configuration. The housing part 3 is identical to the housing of the previous embodiment. As illustrated in FIG. 5, the housing part 3 projects into a housing bottom part 2 that has an upper wide section 2' and a lower narrow section 2". The section 2' has a lid 9 with a central opening 8 through which the housing part 3 projects in a sealed way. The housing part 3 extends into an area near the transition between the two housing sections 2', 2".

In the housing part 3, the control member 4 (FIG. 6) is arranged which is identical to that of the preceding embodiment. The pressure limiter 1 according to FIG. 5 and FIG. 6 operates in the same way as in the embodiment according to FIG. 1 to 4.

The embodiment according to FIGS. 7 through 10 differs from the embodiment described above in that the underside 10 of the housing 3 is open and provided with a second stop 14 for the control member 4 that is positioned at a minimal spacing above the opening of the underside 10. The stop 14 is advantageously identical to the upper stop 6. The housing 3 has a lateral opening 5. Moreover, the control member 4 has its aperture 11 arranged at the underside 7; the upper end 15 is open. The lateral opening 12 of the control member 4 is identical to that of the preceding embodiments.

The flow limiter 1 according to FIGS. 6 through 10 is employed when the suction blower 26 used in the device has a relatively steep characteristic line, for example, in the case of roll body blowers.

Figure 7:
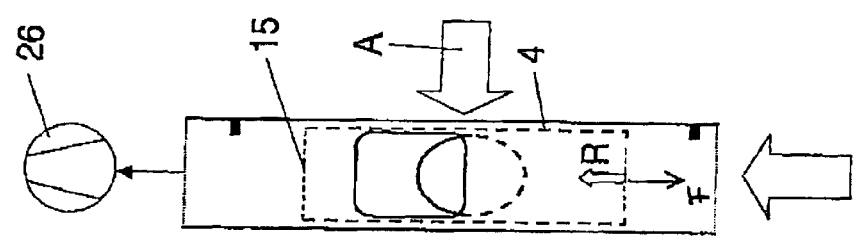
FIG. 7 shows schematically a second embodiment of a flow limiter according to the invention in an initial position.
Figure 8:
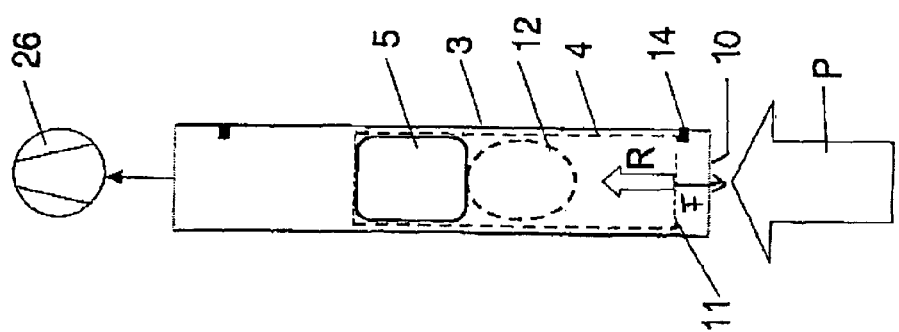
FIG. 8 shows schematically the flow limiter of FIG. 7 in an intermediate position.

As illustrated in FIGS. 7 and 8, the control member 4, in its initial position according to FIG. 7, rest against the lower stop 14 and closes in this way the lateral housing opening 5. In operation, the control member 4 is moved in the direction R under the effect of the suction force of the blower 26 acting on the housing 3. The conveying air that is sucked in flows through the end 10 into the housing 3 and through the aperture 11 into the control member 4. The described pressure loss occurs at the aperture 11 and causes the control member 4 to be moved in the flow direction P of the conveying air. This causes the opening 12 of the control member 4 to partially overlap the housing opening 5 so that an increasingly greater flow cross-section for secondary air is released; this secondary air flows in the direction A laterally into the control member 4 (FIG. 8). By admixing secondary air, the flow velocity of the conveying air is reduced. The pressure loss at the aperture 11 is reduced so that the control member 4 is moved counter to the flow direction P of the conveying air until equilibrium between the restoring force acting on the control member 4 and the force that acts in the opposite direction and is caused by the pressure loss at the aperture 11 is achieved.

In this embodiment, the velocity of the conveying air is also automatically regulated so that it remains within the permissible range. In contrast to the preceding embodiments, the pressure loss is not increased, but secondary air is admixed instead. As in the preceding embodiments, the basic principle is that only the dynamic pressure but not the static pressure has an effect on the position of the control member 4. It is force-neutral, i.e., it neither enhances nor weakens.

The flow limiter according to FIGS. 11 and 12 is used in the same way as the flow limiter of the previous embodiment in connection with suction blowers 26 having a steep characteristic line.

The housing 3 of the flow limiter 1 is open at the upper and lower ends 7, 13. It has a radial pipe connector 16 with an end face 17 that has an opening 18 arranged off-center. The opening 18 can be closed by a closing part 19 of a control member 20. The control member 20 is formed as a two-arm lever having a first pivot arm 21 provided with a throttle member 22 and a second pivot arm 23 provided with the closing part 19; preferably, the throttle member 22 and the closing part 19 are pivotably connected to the pivot arms 21, 23, respectively.

The pivot axis 24 of the control member 20 is positioned approximately tangentially or off-center to the housing wall 25. The pivot arms 21, 23 that are positioned at an obtuse angle relative to one another are approximately of the same length. The throttle member 22 is, for example, embodied as a disk that is positioned approximately centrally relative to the housing 3 and has a spacing all-around relative to the housing wall 25. The conveying air enters the housing 3 through the end 7. The throttle member 22 is positioned in the flow path of the conveying air within the housing 3. The conveying air enters the housing 3 through the end 13 and flows around the throttle member 22. The throttle member 22 is deflected by the conveying air when a preset flow velocity is surpassed. In the illustrated embodiment, the control member 20 pivots in the clockwise direction about the axis 24. By means of the pivot arm 23 the closing part 19 is moved so that the opening 18 of the pipe socket 16, depending on the pivot angle of the control member 20, can be opened more or less (FIG. 12). The exterior air A (secondary air) flows via the free opening cross-section radially into the housing 3.

The closing part 19 is a flap that is preferably of a somewhat greater cross-section than the opening 18 of the housing 3 so that it is completely covered in the closed position. The flap 19 is connected pivotably to the pivot arm 23 such that it is vertical in any position. In the initial position illustrated in FIG. 11, the flap 19 closes the housing opening 18 completely, and the control member 20 is secured in its initial position because the flap 19 rests against the end wall 17 of the pipe socket 16. When the suction force R of the blower 26 acting on the conveying air becomes greater than the restoring force of the control member 20, the control member 20 is pivoted in the clockwise direction about the axis 24. The throttle member 22 is lifted accordingly within the housing 3 while the flap 19 releases the opening 18 in the pipe socket 16 in accordance with the pivot angle of the control member 20. The secondary air that now flows radially into the housing 3 causes a reduction of the suction force R and thus a reduction of the flow velocity of the conveying air; this is indicated by the size of the illustrated flow arrows in FIG. 12. In accordance with the reduced flow velocity, the control member 20 pivots back counterclockwise until equilibrium is reached between the restoring force and the suction force. The flow velocity of the conveying area is thus always within the permissible range. This embodiment also ensures that the pressure limiter 1 will directly release the intake opening 18 and accordingly prevent undesirable vibrations when the flow velocity of the conveying air increases.

The flow limiter is positioned in the area downstream of the conveying device so that only conveying air but not the material to be conveyed will flow through the flow limiter.

The flow limiter according to FIGS. 1 through 6 is positioned, as needed, upstream or downstream of the blower while the flow limiter according to FIGS. 7 through 12 is arranged upstream of the blower.

While specific embodiments of the invention have been shown and described in detail to illustrate the inventive principles, it will be understood that the invention may be embodied otherwise without departing from such principles.

What is claimed is:

1. A device for pneumatically conveying bulk material, the device comprising:

at least one flow limiter arranged in a conveying airstream comprising an entrained bulk material, wherein the flow limiter comprises a housing and at least one control member arranged in the housing;

wherein the at least one control member is positioned in the conveying airstream so that the control member is exposed to a mass flow of the conveying airstream, wherein the mass flow has a dynamic pressure differential exerting a force on the at least one control member and wherein the at least one control member, as a function of the dynamic pressure differential, is moved within the housing and controls a flow velocity of the conveying airstream within a permissible range.

2. The device according to claim 1, wherein at least one of the housing and the at least one control member has at least one opening for the conveying airstream or for a secondary air flow.

3. The device according to claim 2, wherein the at least one control member has a peripheral wall and wherein the at least one opening is arranged in the peripheral wall.

4. The device according to claim 3, wherein the housing has a housing wall and wherein the at least one opening is provided in the housing wall.

5. A device for pneumatically conveying bulk material, the device comprising:

at least one flow limiter arranged in a conveying airstream for conveying bulk material, wherein the flow limiter comprises a housing and at least one control member arranged in the housing;

wherein the control member, as a function of a dynamic pressure differential, controls a flow velocity of the conveying airstream;

wherein at least one of the housing and the at least one control member has at least one opening for the conveying airstream or for a secondary air flow;

wherein the at least one control member has a peripheral wall and wherein the at least one opening is arranged in the peripheral wall;

wherein the housing has a housing wall and wherein the at least one opening is provided in the housing wall;

wherein the at least one opening of the housing wall and the at least one opening of the peripheral wall overlap one another in a control position.

6. The device according to claim 5, wherein the dynamic pressure differential determines the overlap.

7. The device according to claim 2, wherein the secondary air flow is guided transversely into the conveying airstream.

8. The device according to claim 2, wherein the at least one control member comprises an approximately axially adjustable throttle member arranged in the housing.

9. The device according to claim 8, wherein the at least one control member has a closing part for the at least one opening provided in the housing.

10. The device according to claim 9, wherein the control member is a two-arm lever comprising a first pivot arm and a second pivot arm.

11. The device according to claim 10, wherein the throttle member is arranged on the first pivot arm and the closing part is arranged on the second pivot arm.

12. The device according to claim 10, wherein a pivot axis of the two-arm lever is positioned off-center relative to the housing.

13. The device according to claim 9, wherein the closing part is a slidable flap.

14. The device according to claim 2, wherein the at least one opening is provided in a radial projection of the housing.

15. The device according to claim 1, wherein the at least one control member is adjustable in the housing in an area between two end positions.

16. The device according to claim 15, wherein the at least one control member is slidably arranged in the housing.

17. The device according to claim 15, wherein the at least one control member is pivotably arranged in the housing.

18. The device according to claim 1, wherein the at least one control member has at least one open end.

19. The device according to claim 1, wherein the at least one control member is pipe-shaped.

20. The device according to claim 1, wherein the at least one control member has two open ends.

21. The device according to claim 1, wherein the at least one control member is configured such that the conveying air flows at least across a portion of the length of the at least one control member in a longitudinal direction of the at least one control member.

22. The device according to claim 1, wherein the at least one control member has at least one aperture in a flow direction of the conveying airstream.

23. The device according to claim 22, wherein the at least one control member has a lid and the aperture is at least one opening in the lid.

24. The device according to claim 1, wherein the position of the at least one control member in the housing is determined by an equilibrium between a restoring force acting on the at least one control member and an opposed force oriented in a direction opposite to the restoring force, wherein the opposed force is the force exerted by the dynamic pressure differential on the at least one control member.

* * * * *